Figure 1:
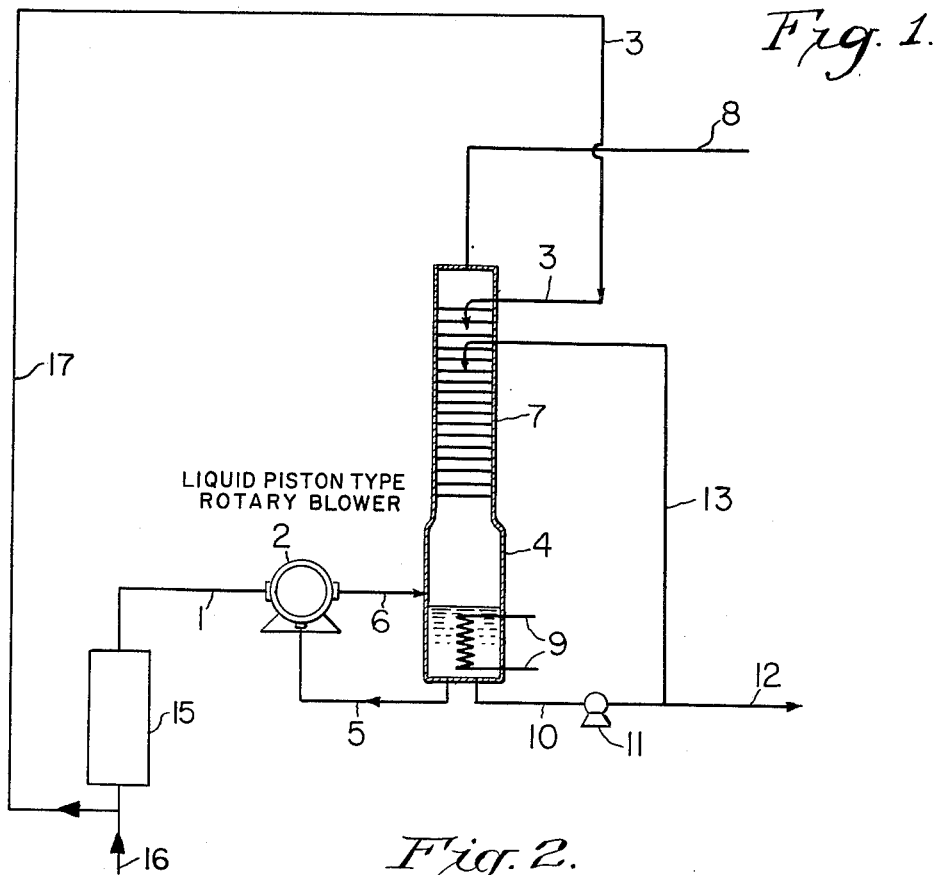

INVENTORS
JOSEF HIRSCHBECK
and ADOLF ROTHE

United States Patent Office 3,133,875
Patented May 19, 1964

3,133,875
PROCESS FOR REMOVING FOGS AND VAPORS FROM GASES AND GAS MIXTURES
Josef Hirschbeck, Burgkirchen, Upper Bavaria, and Adolf Rothe, Altotting, Upper Bavaria, Germany, assignors to Farbwerke Hoechst Aktiengesellschaft vormals Meister Lucius & Brüning, Frankfurt am Main, Germany, a corporation of Germany
Filed Nov. 29, 1957, Ser. No. 699,575
Claims priority, application Germany Dec. 1, 1956
12 Claims. (Cl. 208—82)

The present invention relates to a process for removing mists and vapors from gases and gas mixtures.

When further processing the gases and gas mixtures obtained in the course of numerous chemical processes, great difficulties are encountered when trying to remove the fogs otherwise referred to as mists and vapors from these gases and gas mixtures. This is especially the case when processing and decomposing mixtures of fogs and vapors with gases, which mixtures may form in the course of many reactions and conversions of hydrocarbons, for example when cracking hydrocarbons or polymerizing olefins. For these operations, the dispersion of fogs and vapors from gases and gas mixtures is, in most cases, indispensable since the further treatment of the reaction gas requires, as a rule, freedom from fogs and vapors.

There have already been proposed several methods for the dispersion of fogs and vapors from gases and gas mixtures, for example washing said gases and gas mixtures in washing towers equipped with filling bodies or bubble trays, in field washers, conducting said gases through finely porous substances or electrostatic precipitators. When employing these methods, the desired effect is, in some instances, achieved but incompletely, in other instances considerable expenditure is involved for the installation of apparatus.

Now we have found that fogs and vapors can be removed from gases and gas mixtures in a safe and simple manner by bringing said gases and gas mixtures containing fogs and vapors into intimate, turbulent contact with the surface of a liquid which is capable of removing the substances forming the fogs and vapors from said gases and gas mixtures, and absorbing said substances. The intimate mixture of gas and liquid which has formed is then separated into a gaseous portion free from fogs and vapors, and into a liquid containing the substances forming the fogs and vapors, by effecting, in a liquid piston type rotary blower, the necessary intimate mixtures of the gases (from which the fogs and vapors are to be removed) with the liquid to be used in the process of removing the fogs and vapors. The mixture of liquid and gas produced in said liquid piston type rotary blower is separated into a gaseous portion free from fogs and vapors, and into a liquid containing the substances forming the fogs and vapors in a vessel being connected in series and having been charged tangentially. The gas leaves the installation for further processing, and part of or all of the liquid is then reconducted to the liquid piston type rotary blower.

The process may be applied to gases which, aside from the contaminations forming fogs and vapors, only consist of one component, and to gas mixtures which may contain a great number of hydrocarbons, furthermore to mixtures of hydrocarbon gases with other gases, such as hydrogen, nitrogen, carbon monoxide, carbon dioxide and sulphur compounds. In the present patent application, the designation "gases" is understood to include all these possibilities.

As washing liquids there may be used as substances of like kind, for example, liquid hydrocarbons, as alien substances there may be used other solvents such as, for example, chlorinated hydrocarbons, alcohols, glycols, glycol ether, glycerine, carbon disulfide or esters of organic acids. The washing liquid must be capable of absorbing and/or dissolving the droplets of liquid suspended in the gas mixture in the form of fog or vapor otherwise described as an aerosol. The washing process may, therefore, also be effected with the same liquid which is suspended in the gas or gas mixture in the form of fog or vapor and which is to be removed by washing. Liquids which would chemically react with the gas to be washed or fractions thereof or which, owing to their vapor pressure, could act as disturbing contamination of the matter to be treated, cannot be used. These conditions must especially be taken into consideration when working at higher temperatures for in itself the new process can be operated independently of the temperature and can thus advantageously be adapted to the operational requirements. The temperature range is limited by the boiling temperature of the liquid to be used at the pressure prevailing when said liquid enters the liquid piston type rotary blower. The process is, likewise, not dependent on a certain operational pressure; thus the dispersion of fogs or vapors from gases and gas mixtures may simultaneously be combined with a compression of the gases and gas mixtures.

The process of the invention may advantageously be carried out such that the gases and the gas mixtures are conducted to a liquid piston type rotary blower (as described in Chem. Eng. Handbook by John H. Perry, McGraw-Hill Book Company, Inc., third edition 1950, page 1452, and illustrated in FIGURE 218), containing a liquid suitable for removing fogs and vapors from gases and gas mixtures, and washed by means of the said liquid by conducting it through the liquid piston type rotary blower.

The advantages of the invention which could not be foreseen and which permit a complete dispersion of fogs and vapors from gases and gas mixtures of the most diverse composition, render it possible to install the apparatus for removing fogs and vapors from gases and gas mixtures at any place of a plant, while the necessary single component parts of the apparatus may, at the same time, have other functions. Thus the liquid piston type rotary blower may be used for compressing the gas; the separating vessel pertaining thereto, for example, serves at the same time as component part of a gas washing tube connected in series for the removal of further gaseous constituents, the separating vessel serving above all as sump of a column filled with Raschig rings or bubble trays.

The process according to the invention is applicable to numerous chemical processes, above all to the conversion of hydrocarbons, such as cracking, dehydration, polymerization, emulsion polymerization, and admits of removing portions of the emulsifier present in the form of fog or vapor from the gas escaping from the polymerization plant.

Figure 2:
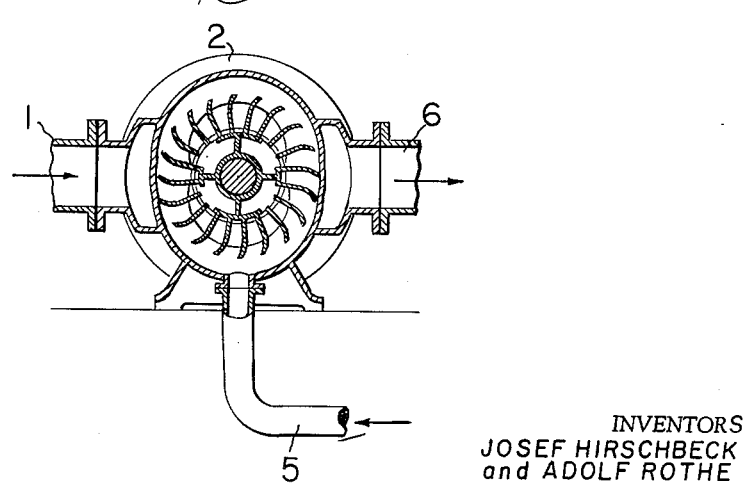

A mode of executing the process of this invention is described with reference to and shown in the accompanying diagrammatical drawings in which:

FIG. 1 is a diagrammatical view in elevation of an embodiment of this invention, and FIG. 2 is a cross-sectional view in elevation of an embodiment shown in FIG. 1.

Crude cracked gas as obtained when cracking hydrocarbons in cracking apparatus schematically indicated by block 15 is conducted through conduit 1 to liquid piston type rotary blower 2 with separating vessel 4 being filled with a liquid. The crude oil hydrocarbons or fraction thereof to be treated in the cracking installation and supplied thereto through conduit 16 may, for example, serve as liquid for carrying out the operation, said liquid being conducted through conduit 17 and conduit 3 and washing tube 7 to separating vessel 4. From this vessel, the amount of oil necessary for charging pump 2 is withdrawn through conduit 5, said amount of oil being reconducted together with the cracked gas to separating vessel 4 through conduit 6. In vessel 4 the gaseous constituents separate from the liquid constituents. The gaseous constituents are passed through the oil being fed through conduit 3 and trickling down bubble trays 7, and are thus subjected to a rewashing operation. The gases leaving the installation through conduit 8 are now completely free from fogs and vapors. The oil, enriched in separating vessel 4 with the absorbed fogs and vapors, may, if necessary, be cooled or warmed up by means of a system of spiral tubes 9 and is conducted through conduit 10, pump 11 and conduit 12 to the cracking installation and replaced by admitting a corresponding amount of crude oil through pipe 3. When it is desired to charge washing tube 7 with a large amount of oil, part of the oil already containing absorbed fogs and vapors may be reconducted into the cycle via conduit 13.

If the cracked gas were to be conducted into the separating vessel and washing tube direct instead of conducting it through the liquid piston type rotary blower, there could—even when charging the washing tube with large amounts of oil—still be traced disturbing amounts of hydrocarbon fogs and vapors in the gas escaping through conduit 8.

We claim:
1. A process for completely removing droplets of a liquid substance in the form of an aerosol from a gas which carries them comprising the pumping of said gas through a liquid piston type rotary blower and a series-connected separating vessel which is charged by said liquid piston type rotary blower, said liquid piston type rotary blower and said separating vessel containing a liquid in which said droplets are soluble, and said gas being thereby thrown into intimate turbulent surface contact with said liquid to completely remove all of said droplets from said gas.

2. The process of claim 1, wherein said aerosol is removed from a gas consisting of a hydrocarbon, aside from the substances forming said aerosol.

3. The process of claim 1, wherein said aerosol is removed from a gas mixture containing said aerosol and consisting of a mixture of hydrocarbons, aside from the substances forming said aerosol.

4. The process of claim 1, wherein said aerosol is removed from a gas mixture consisting of a hydrocarbon and another gas or gases selected from the group consisting of hydrogen, nitrogen, carbon monoxide, carbon dioxide and sulphur compounds.

5. The process of claim 1, wherein said aerosol is removed from a gas mixture consisting of a mixture of hydrocarbons and another gas or gases selected from the group consisting of hydrogen, nitrogen, carbon monoxide, carbon dioxide and sulphur compounds.

6. The process of claim 1, wherein as washing liquids for removing said aerosol from said gas liquids of a kind similar to said aerosol are used.

7. The process of claim 1, wherein as washing liquids for removing said aerosol from said gas liquids of a kind which are alien to said aerosol are used.

8. The process of claim 1, wherein said separating vessel which is series-connected with said liquid piston type rotary blower and employed for the separation of gas and liquid also serves as a component part of a further gas washing device.

9. The process of claim 8, wherein said liquid used for removing said aerosol is reconducted from the bottom of said separating vessel to said liquid piston type rotary blower.

10. The process of claim 9, wherein only part of said liquid used for removing said aerosol is reconducted from the bottom of said separating vessel to said liquid piston type rotary blower.

11. The process of claim 1 for removing said aerosol from hydrocarbons cracked in a cracking process which takes place prior to and in combination with the process of the present invention, and wherein hydrocarbons used for the cracking operation serve as liquid for the removal of said aerosol.

12. The process of claim 11, wherein fractions in the boiling temperature range of said crude oil hydrocarbons being treated in said cracking process are used as said liquid for the removal of said aerosol.

References Cited in the file of this patent

UNITED STATES PATENTS

| | | |
|---|---|---|
| 1,282,799 | Frasch | Oct. 29, 1918 |
| 1,762,229 | Isom | June 10, 1930 |
| 2,098,378 | Dodge | Nov. 9, 1937 |
| 2,260,600 | Boeckeler | Oct. 28, 1941 |
| 2,280,100 | Singleton | Apr. 21, 1942 |
| 2,413,461 | Mann | Dec. 31, 1946 |
| 2,453,374 | Kollsman | Nov. 9, 1948 |
| 2,603,305 | Hachmuth | July 15, 1952 |
| 2,668,754 | Lichtenfels | Feb. 9, 1954 |
| 2,758,068 | Howard | Aug. 7, 1956 |
| 2,812,830 | Sattler et al. | Nov. 12, 1957 |
| 2,858,903 | Goetz et al. | Nov. 4, 1958 |
| 2,947,383 | Schytil et al. | Aug. 2, 1960 |

OTHER REFERENCES

Chem. Eng. Handbook by John H. Perry, McGraw-Hill Book Co., Inc., 3rd edition, 1950, page 1452, FIGURE 128.